(12) United States Patent
Bagnall

(10) Patent No.: US 7,086,349 B2
(45) Date of Patent: Aug. 8, 2006

(54) FLOATING RAIL-GUIDED AQUARIUM DOCK

(75) Inventor: Gary Wayne Bagnall, Arroyo Grande, CA (US)

(73) Assignee: Zoo Med Laboratories, Inc., San Luis Obispo, CA (US)

( * ) Notice: Subject to any disclaimer, the term of this patent is extended or adjusted under 35 U.S.C. 154(b) by 0 days.

(21) Appl. No.: 10/752,641

(22) Filed: Jan. 6, 2004

(65) Prior Publication Data
US 2005/0145190 A1 Jul. 7, 2005

(51) Int. Cl.
*A01K 63/00* (2006.01)

(52) U.S. Cl. ...................................... 119/253; 119/246

(58) Field of Classification Search ................ 119/253, 119/246, 247, 248, 51.02, 51.04, 259, 274, 119/256; 4/496, 504, 511; D25/2; D23/208; D30/104
See application file for complete search history.

(56) References Cited

U.S. PATENT DOCUMENTS

| D104,077 S  | * | 4/1937  | Miller       | D23/208   |
|-------------|---|---------|--------------|-----------|
| 2,727,489 A | * | 12/1955 | Sklar        | 119/51.04 |
| 3,517,649 A | * | 6/1970  | Holden       | 119/253   |
| 4,820,556 A | * | 4/1989  | Goldman et al. | 119/253 |
| 5,377,623 A | * | 1/1995  | Parr         | 119/256   |
| 5,722,347 A | * | 3/1998  | Tominaga et al. | 119/253 |
| 6,029,605 A | * | 2/2000  | Licata       | 119/246   |
| 6,170,093 B1 | * | 1/2001 | Kowalski     | 4/496     |
| 6,237,166 B1 | * | 5/2001 | Stalfire     | 4/496     |
| 6,532,899 B1 | * | 3/2003 | Hootman      | 119/253   |

OTHER PUBLICATIONS

Jun. 4, 2004 Printout of web page at http://www.novalek.com/tptr.htm (pp. 1-2), showing a product that was for sale prior to the present invention.
Jun. 4, 2004 Printout of web page at http://www.pet-tech.com/aquatic_landings.htm (pp. 1-2), showing a product that was for sale prior to the present invention.
Jun. 4, 2004 Printout of web page at http://www.pet-tech.com/floating_island.htm, showing a product that was for sale prior to the present invention.
Jun. 4, 2004 Printout of web page at http://www.superpetusa.com/catalog/viewone.asp?itemNumber=60838, showing a product that was for sale prior to the present invention.

* cited by examiner

Primary Examiner—Michael J. Carone
Assistant Examiner—Elizabeth Shaw
(74) Attorney, Agent, or Firm—Mitchell Silberberg & Knupp LLP

(57) ABSTRACT

Provided is a floating dock for use in an aquarium. In one particular configuration, the dock rides along one or more rails that extend into the aquarium, thereby confining the movement of the dock within the aquarium. Such a dock may be used by aquatic life in the aquarium, e.g., for basking and/or for resting.

26 Claims, 2 Drawing Sheets

FLOATING RAIL-GUIDED AQUARIUM DOCK

BACKGROUND OF THE INVENTION

1. Field of the Invention

The present invention generally pertains to accessories for use in a fish aquarium, of the type that commonly is used in the home, and particularly concerns a floating dock for use in such an aquarium.

2. Description of the Related Art

Many people have an aquarium in their homes and/or places of business. Such an aquarium typically has a capacity of between approximately 10–100 gallons and is capable of sustaining a wide variety of fish and other aquatic life. Some of such aquatic life lives exclusively in the water. However, other types of aquatic animals live partially in the water and partially outside of the water. Accordingly, for this latter category of aquatic life, it often is desirable to provide an easily accessible area outside of the water, for basking and other purposes. However, until now there has been no acceptable solution to this need.

SUMMARY OF THE INVENTION

The present invention addresses this problem by providing a floating dock, for use in an aquarium, that rides along one or more rails.

Thus, in one aspect the invention is directed to an apparatus for use in an aquarium that includes a rail and attachment means for attaching the rail to an aquarium so that the rail runs along an inside surface of a wall of the aquarium. Such attachment means might include, for example, suction cups for attaching to an inside surface of a wall of the aquarium or hooks for hooking to a top edge of the aquarium. The apparatus also includes a dock element that is buoyant and that has sliding means for attaching to the rail and for allowing the dock element to freely slide along the rail. In the simplest embodiment, such sliding means can be provided as holes in the dock element through which the rails can pass.

By virtue of the foregoing arrangement, it is possible to provide a dock that is always at the surface of the water, irrespective of the height of the water in the aquarium, thereby providing easy access for aquatic life. At the same time, the use of rails often can prevent the dock from floating arbitrarily within the aquarium and from tilting excessively.

According to another aspect, the invention is directed to an apparatus for use in an aquarium that includes a rail and support means for supporting the rail so that the rail extends into the aquarium. Such support means might include, for example, suction cups for attaching to an inside surface of a wall of the aquarium, hooks for hooking to a top edge of the aquarium, a clamping mechanism for clamping to a wall of the aquarium, or a support structure that is mounted or positioned outside of the aquarium. The apparatus also includes a dock element that is buoyant and that has sliding means for attaching to the rail and for allowing the dock element to freely slide along the rail. In the simplest embodiment, such sliding means can be provided as holes in the dock element through which the rails can pass.

In more particularized aspects, the dock element according to the present invention includes a platform section which is at least approximately horizontal in ordinary use and a ramp that extends downwardly at an angle from the platform into the water. The provision of such a ramp can further facilitate access between the water and the platform, and vice versa.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
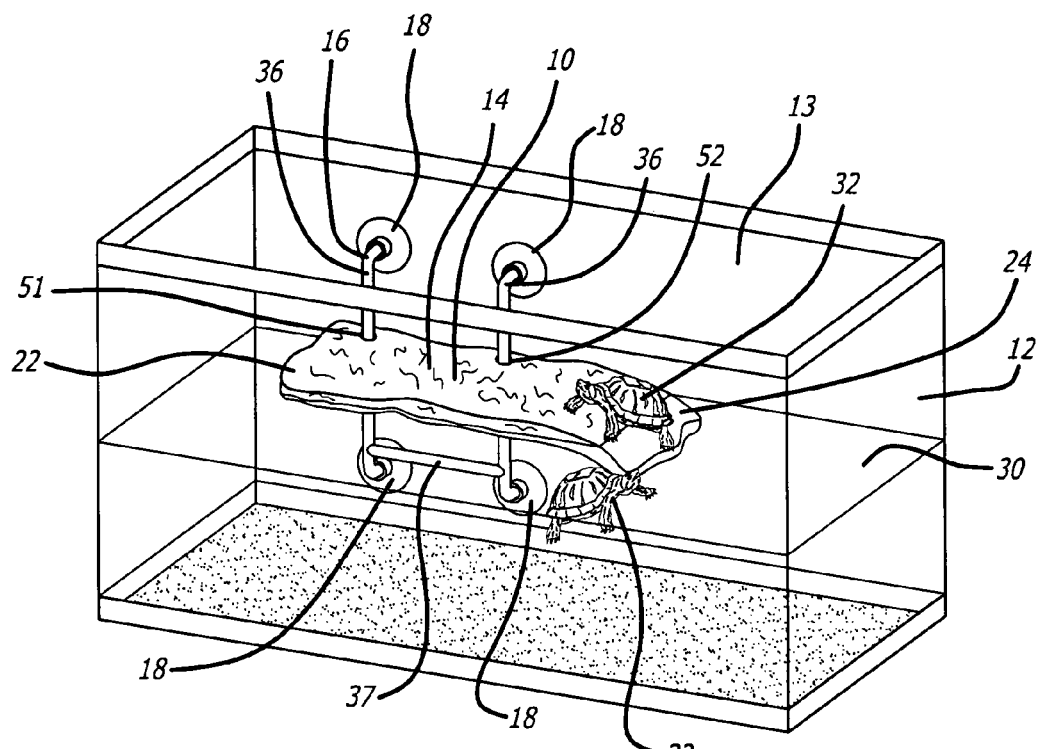
FIG. 1 is a front perspective view of an aquarium dock assembly according to a representative embodiment of the present invention, in use within an aquarium.

FIG. 1 is a front perspective view of an aquarium dock assembly 10 according to a representative embodiment of the present invention, in use within an aquarium 12. As shown, dock assembly 10 includes a dock 14, a rail assembly 16 and suction cups 18 for attaching rail assembly 16 to the inside surface of a wall of the aquarium 12. As shown, the dock 14 preferably has a contoured upper surface. More preferably, such surface is fabricated so as to simulate the appearance of a naturally occurring surface (e.g., rock).

Figure 2:
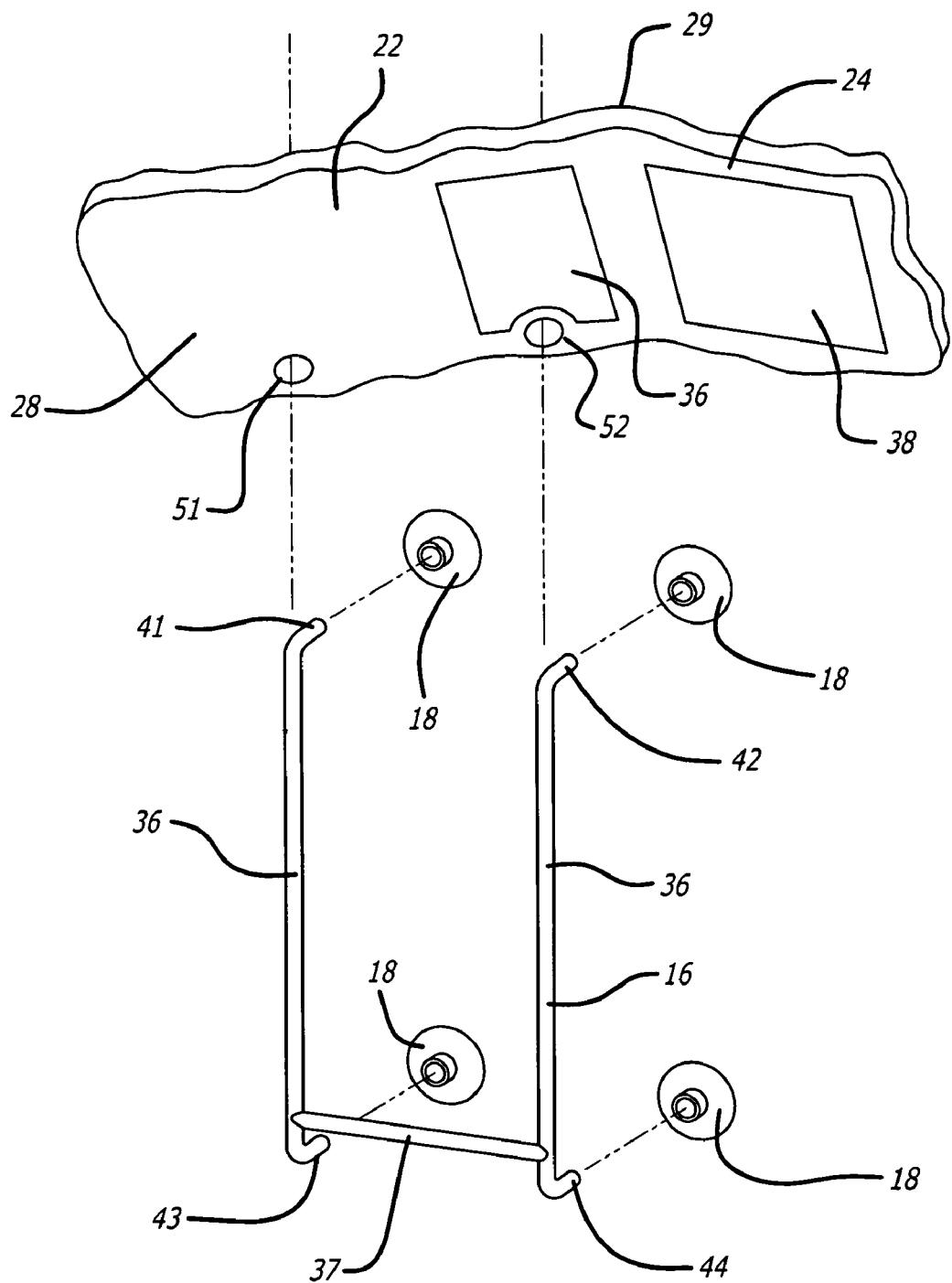
FIG. 2 is an exploded view of the aquarium dock assembly illustrated in FIG. 1.

A better understanding of the construction of dock assembly 10 can be obtained by referring to FIG. 2, which illustrates an exploded view of assembly 10, in conjunction with FIG. 1. As shown in FIGS. 1 and 2, dock 14 generally has two sections: a platform 22 that is at least approximately planar and a ramp 24 that extends at a downward angle from platform 22. As shown, dock 14 preferably is fabricated as a unitary piece. In use, platform 22 is horizontal and, for the most part, floats on the surface 30 of the water in aquarium 12. Ramp 24, on the other hand, extends downwardly and beneath the surface 30 of the water, so that a portion of ramp 24 is above surface 30 and another portion is below the surface 30. Thus, the use of ramp 24 allows turtles 32 (and other aquatic life) to swim up to ramp 24, and then climb up ramp 24 until they reach the top surface of platform 22 (which is above the surface 30 of the water).

In order to maintain this configuration, it is preferable to appropriately weight sections 22 and 24. This is illustrated in FIG. 2, in which the bottom surface 28 of dock 14 is shown. In the preferred embodiments of the invention, dock 14 is mainly formed from a single type of material (e.g., polyresin) that is buoyant. As shown in FIG. 2, however, the portion of platform 22 that is near the edge 29 between platform 22 and ramp 24 has an embedded weight 36. Similarly, ramp 24 itself also has an embedded weight 38. Preferably, weights 36 and 38 are formed from the same material (e.g., a mixture of polyresin and gravel).

As shown, weight 38 is larger than weight 36 in the present embodiment of the invention. While this is not strictly necessary, it generally will be desirable for ramp 24 to have an overall density that is greater than the overall density of platform 22 and that is greater than the density of water, so that platform 22 floats and ramp 24 extends into the water.

The foregoing use of separate weights 36 and 38 can provide the desired configuration (i.e., with platform 22 being substantially level and horizontal and ramp 24 extending underneath the surface 30 of the water) when dock assembly 10 is in use. However, this particular configuration is not strictly necessary, and any other use of buoyant and non-buoyant materials (or any other configuration) to achieve the same effect instead may be used.

As further shown in FIG. 2, rail assembly 16 is implemented as a unitary piece in the present embodiment of the invention. More specifically, rail assembly 16 has two vertically oriented rails 36 that are connected by a cross rail 37 near their bottom ends. Also, the end of each rail 36 is bent perpendicularly toward the wall 13 of the aquarium 12 to which it is to be attached. This bend provides a small foot 41–44 to which the suction cups 18 may be detachably attached. However, prior to attaching the upper suction cups 18, the upper feet 41 and 42 are first inserted through the corresponding holes 51 and 52 in platform 22 of dock 12. In the preferred embodiments of the invention, both rail assembly 16 and suction cups 18 are made of plastic.

Once dock assembly 10 has been assembled in the foregoing manner, the suction cups 18 may be attached to the inside surface of the wall 13, with rails 36 being substantially vertical and substantially parallel to each other. When attached to aquarium 12 in this manner, dock 10 will be able to slide up and down along rail assembly 16, from the cross rail 37 to the bends forming feet 41 and 42. Accordingly, dock assembly 10 preferably is installed so that the water level 30 is between those two endpoints and, more preferably, is approximately halfway between such endpoints. It is noted that the use of suction cups 18 can permit dock assembly 10 to be installed either prior to filling aquarium 12 with water or afterwards.

Figure 3:
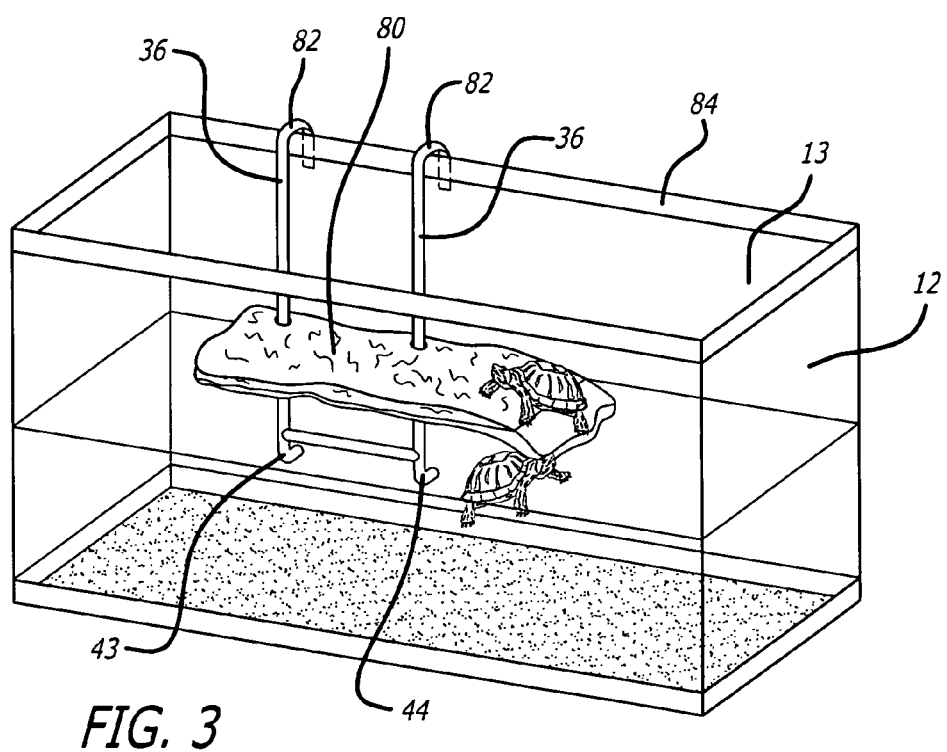
FIG. 3 is a front perspective view of an aquarium dock assembly according to a second representative embodiment of the present invention, in use within an aquarium.

An alternate embodiment of the invention is dock assembly 80, illustrated in FIG. 3. As shown in FIG. 3, dock assembly 80 is identical to dock assembly 10, except that dock assembly 80 uses a different means for attaching to wall 13 of aquarium 12. Specifically, in dock assembly 80 the top ends of rails 36 form hooks 82 that are configured so as to be capable of hooking over the top edge 84 of aquarium 12. Also, the bottom feet 43 and 44 of rails 36 do not have suction cups attached (although it is possible to use suction cups on bottom feet 43 and 44 in this embodiment as well). Rather, in the present embodiment, bottom feet 43 and 44 may be uncovered or may, for example, be covered with a rubber or synthetic rubber cap.

In still further embodiments of the invention, other means may be utilized for attaching the rails 36 to the aquarium 12. For example, rails 36 may be clamped onto the top edge 84 of aquarium 12, with capped or uncapped lower feet 43 and 44.

Additional Considerations

In the embodiments described above and shown in the figures, a single ramp 24 extends from only one side of the platform 22 of dock 12. However, in alternate embodiments multiple and/or different ramps may be provided. For example, in FIGS. 1–3 the ramp 24 is provided on the right side of platform 22; in alternate embodiments, the ramp may be provided on the left side of platform 22 and/or on the front portion of platform 22 instead of, or in addition to, on the right side. Any such ramp preferably would extend down beneath the surface 30 of the water, for allowing aquatic animals to crawl up out of the water.

A significant aspect of a dock assembly according to the present invention is the use of a buoyant dock that is free to move up and down (and, in the preferred embodiments of the invention, that slides along rails in order to confine the dock's lateral motion and to prevent excessive tilting). In this way, the dock rises and falls with the water level, thereby providing a solid surface that is above the surface of the water, irrespective of the water's level, and that simultaneously is always near the water's surface, thereby providing relatively easy access for aquatic animals. In order to achieve these advantages, the dock should have a net positive buoyancy, and should be able to remain buoyant even with the expected load (i.e., the weight of the animals that simultaneously are expected to be on the dock), e.g., a minimum load of 8, 12, 16, 20 or 24 ounces. However, as noted above, it generally also is desirable to have a portion of the dock extending into the water for further facilitating access from the water to the dock and vice versa, and this can be accomplished by weighting portions of the dock to be non-buoyant.

In the embodiments described above, the rail(s) are substantially vertical. While this generally is preferred, it is not necessary; rather, the rail(s) may extend into the aquarium at any desired angle.

It is noted that, although rails are used in the preferred embodiments of the invention, rails need not be used in all embodiments. For instance, it is possible to construct a dock that has a platform section (e.g., identical to platform 22) and ramps extending into the water, e.g., along the entire periphery of such platform. In such an embodiment, the dock typically would be free-floating and therefore more susceptible to movement within the aquarium and to tilting, although the amount of tilting might be limited by including ramps around the entire periphery, employing appropriate weighting and/or using other known means to increase the stability of the dock. Similarly, in such an embodiment the amount of movement within the aquarium might be limited by using anchors and/or similar techniques.

Even in embodiments where rails are used, it is not necessarily in each such embodiment to attach such rails to a wall of the aquarium. Rather, for example, the rail assembly may be mounted outside of the aquarium, with the rails extending over an upper edge of the aquarium and into the aquarium without physically touching any of its walls. Similarly, the rail assembly may be mounted only to the outside surface of a wall of the aquarium, with the rails extending over the upper edge of the aquarium and into the aquarium without physically touching any inner surface of an aquarium wall.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for use in an aquarium, said apparatus comprising:

(a) a rail;
(b) attachment means for attaching the rail to a top edge of an aquarium so that the rail runs along an inside surface of a wall of the aquarium; and
(c) a dock element that is buoyant and that has sliding means for attaching to the rail and for allowing the dock element to freely slide along the rail as a water level in the aquarium varies,
wherein the dock element includes a main portion and a ramp portion, each having a top surface and a bottom surface, and
wherein both the top and bottom surfaces of the ramp portion extend at a downward angle relative to the top and bottom surfaces of the main portion.

2. An apparatus according to claim 1, wherein the attachment means comprises at least one suction cup.

3. An apparatus according to claim 1, wherein the attachment means is capable of attaching the rail to an underwater point on the inside surface of the wall of the aquarium.

4. An apparatus according to claim 1, wherein the sliding means comprises at least one hole through the dock element for accommodating the rail.

5. An apparatus according to claim 1, wherein at least a portion of a top surface of the dock element is contoured.

6. An apparatus according to claim 1, wherein a selected portion of the dock element is weighted relative to the remainder of the dock element.

7. An apparatus according to claim 6, wherein the selected portion of the dock element is weighted by an embedded weight having a higher mass density than the remainder of the dock element.

8. An apparatus according to claim 1, wherein the dock element is comprised of a polyresin.

9. An apparatus for use in an aquarium, said apparatus comprising:
(a) a first rail and a second rail;
(b) attachment means for attaching the first rail and the second rail to a top edge of an aquarium so that the first and second rails run along an inside surface of a wall of the aquarium; and
(c) a dock element that is buoyant and that has sliding means for attaching to the first and second rails and for allowing the dock element to freely slide along the first and second rails as a water level in the aquarium varies,
wherein the second rail is attached to the first rail at a position in addition to the common attachment to the dock element.

10. An apparatus according to claim 9, wherein the second rail runs in parallel with the first rail.

11. An apparatus for use in an aquarium, said apparatus comprising:
(a) a rail;
(b) attachment means for attaching the rail to an aquarium so that the rail runs along an inside surface of a wall of the aquarium; and
(c) a dock element that is buoyant and that has sliding means for attaching to the rail and for allowing the dock element to freely slide along the rail,
wherein the dock element comprises a platform that is approximately planar and a ramp that is oriented at a downward angle to the platform, and
wherein the ramp has an overall density that is greater than the overall density of the platform and that is greater than the density of water.

12. An apparatus for use in an aquarium, said apparatus comprising:
(a) a rail;
(b) attachment means for attaching the rail to a top edge of an aquarium so that the rail runs along an inside surface of a wall of the aquarium; and
(c) a dock element that is buoyant and that has sliding means for attaching to the rail and for allowing the dock element to freely slide along the rail as a water level in the aquarium varies.

13. An apparatus according to claim 12, wherein the attachment means comprises a hook configured to hook to a top edge of the aquarium.

14. An apparatus for use in an aquarium, said apparatus comprising:
(a) a rail;
(b) support means for supporting the rail so that the rail extends into the aquarium from a location outside of the aquarium; and
(c) a dock element that is buoyant and that has sliding means for attaching to the rail and for allowing the dock element to freely slide along the rail as a water level in the aquarium varies.

15. An apparatus according to claim 14, further comprising a second rail, wherein the support means also is for supporting the second rail so that the second rail extends into the aquarium, and wherein the sliding means also is for permitting the dock element to slide along the second rail, as well as the rail.

16. An apparatus according to claim 15, wherein the second rail is attached to and runs in parallel with the rail.

17. An apparatus according to claim 14, wherein the dock element includes a main portion and a ramp portion, each having a top surface and a bottom surface, and wherein both the top and bottom surfaces of the ramp portion extend at a downward angle relative to the top and bottom surfaces of the main portion.

18. An apparatus according to claim 14, wherein the rail runs in a substantially vertical orientation when supported by the support means.

19. An apparatus according to claim 14, wherein the support means comprises at least one suction cup.

20. An apparatus according to claim 14, wherein the sliding means comprises at least one hole through the dock element for accommodating the rail.

21. An apparatus according to claim 14, wherein at least a portion of a top surface of the dock element is contoured.

22. An apparatus according to claim 14, wherein the support means comprises a hook configured to hook to a top edge of the aquarium.

23. An apparatus according to claim 14, wherein a selected portion of the dock element is weighted relative to the remainder of the dock element.

24. An apparatus according to claim 23, wherein the selected portion of the dock element is weighted by an embedded weight having a higher mass density than the remainder of the dock element.

25. An apparatus according to claim 14, wherein the dock element is comprised of a polyresin.

26. An apparatus for use in an aquarium, said apparatus comprising:
(a) a rail;
(b) support means for supporting the rail so that the rail extends into the aquarium; and
(c) a dock element that is buoyant and that has sliding means for attaching to the rail and for allowing the dock element to freely slide along the rail,
wherein the dock element comprises a platform that is approximately planar and a ramp that is oriented at a downward angle to the platform, and
wherein the ramp has an overall density that is greater than the overall density of the platform and that is greater than the density of water.

* * * * *